L. W. FISHER.

Ditching-Machines.

No. 133,974. Patented Dec. 17, 1872.

Witnesses:
A. Bennerkendorf
C. Sedgwick

Inventor:
L. W. Fisher
per Munn & Co.
Attorneys.

UNITED STATES PATENT OFFICE.

LEWIS W. FISHER, OF ROCKVILLE, INDIANA.

IMPROVEMENT IN DITCHING-MACHINES.

Specification forming part of Letters Patent No. 133,974, dated December 17, 1872.

*To all whom it may concern:*

Be it known that I, LEWIS W. FISHER, of Rockville, in the county of Parke and State of Indiana, have invented a new and Improved Ditching-Machine, of which the following is a specification:

My invention consists of a frame adapted to drag along the ground with a ditching-spade arranged to be adjusted lower for each successive cut, and to force the earth raised by it up to the surface in front of a diverging portion of the frame, which spreads the discharged earth upon each bank of the ditch, all as hereinafter described.

Figure 1:
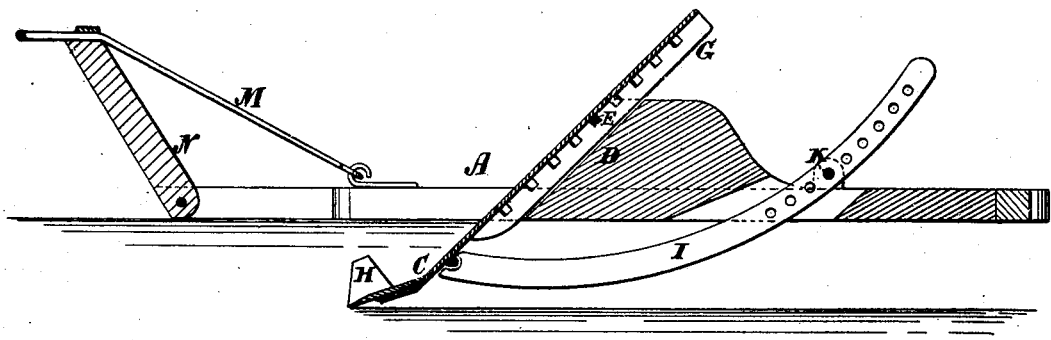
Figure 2:
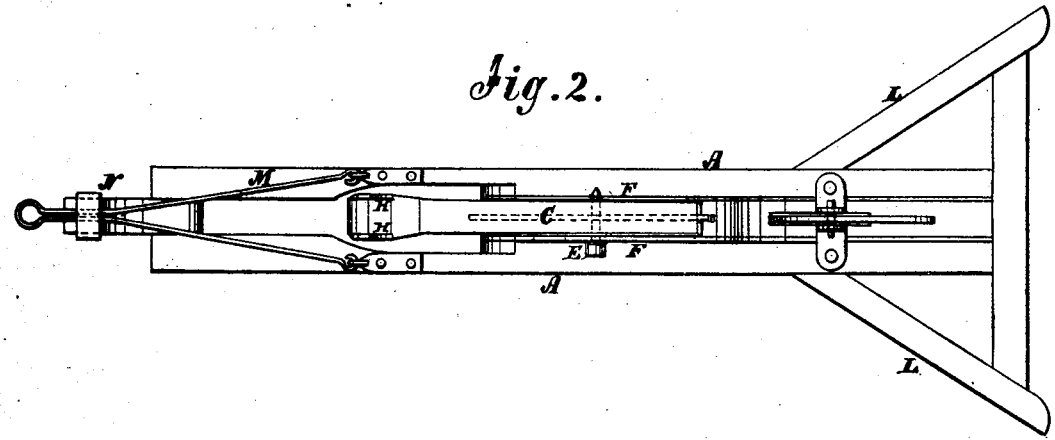

Figure 1 is a longitudinal sectional elevation of my improved machine, and Fig. 2 is a plan view.

Similar letters of reference indicate corresponding parts.

A represents a long frame of two parallel beams placed about as wide apart as the width of the ditch to be formed, connected by suitable cross-pieces and having diverging bars L, for spreading the earth forced out of the ditch on the banks as it is delivered from the spade. C is a ditching-spade arranged obliquely between the two beams of the frame on a rest, D, so as to be shifted downward after each cut the requisite distance for the next cut and be fastened by a bolt, E, passing through side plates F on the rest D; also, through a strengthening-rib, G, on the back of the blade of the spade. The spade consists of a flat plate merely, except at the lower end, where it is provided with side pieces H about as high as the depth of a single cutting. I represents a curved brace bearing against the under side of the blade, near the lower end, and passing up through the frame behind, with a series of holes for adjusting the spade by means of the bolt K, as shown. L represents spreading-beams diverging from the frame sidewise each way to spread the earth raised up by the spade and discharged from the upper portion over the frame each way. M and N represent the devices to which the team is hitched for drawing the machine.

Having thus described my invention, I claim as new and desire to secure by Letters Patent—

1. The combination of the frame A, adjustable spade C, and spreading-beams L, substantially as specified.

2. The curved brace I bearing against the under side of lower end of blade and adjustable in the frame behind, as described.

LEWIS W. FISHER.

Witnesses:
    THEODORE R. ALDEN,
    LEVI F. ALDEN.